(No Model.)
J. T. LITTELL.
TOMBSTONE.
No. 532,886. Patented Jan. 22, 1895.
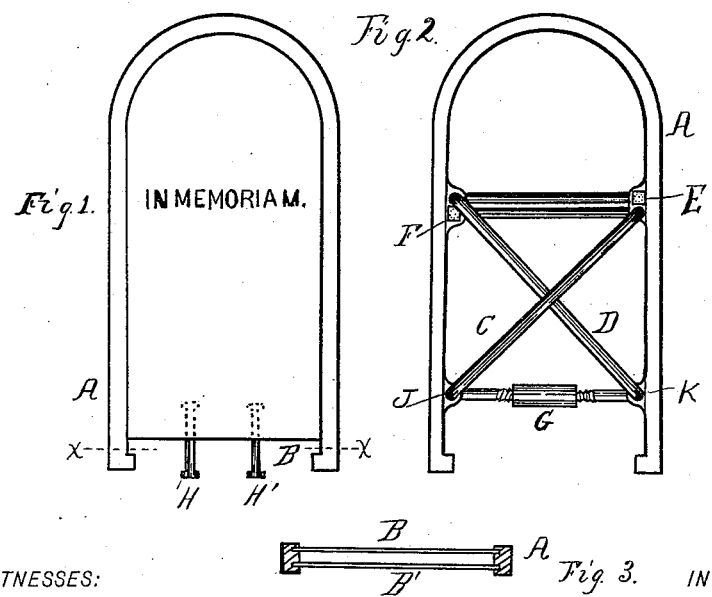
WITNESSES:
INVENTOR
John T. Littell
BY
H. A. Buerk
ATTORNEY.

UNITED STATES PATENT OFFICE.

JOHN T. LITTELL, OF BORDEN, INDIANA.

TOMBSTONE.

SPECIFICATION forming part of Letters Patent No. 532,886, dated January 22, 1895.

Application filed November 10, 1894. Serial No. 528,387. (No model.)

*To all whom it may concern:*

Be it known that I, JOHN T. LITTELL, a citizen of the United States, residing at Borden, in the county of Clark and State of Indiana, have invented certain new and useful Improvements in Tombstones; and I do hereby declare that the following is a full, clear, and exact description of the invention.

My device consists essentially of a metallic frame and transparent back and front faces; inclosed within said faces and frame, an opaque white material on the surface of which is arranged the description and devices of the grave.

The accompanying drawings will disclose my device more in detail.

Figure 1 is a front view of my device ready for insertion in a pedestal. Fig. 2 is a view of the metallic frame with the transparent faces and opaque material removed. Fig. 3, discloses a sectional view of the metallic frame on the line $x$, and the edges of the transparent faces with the opaque material removed.

Similar letters refer to similar parts throughout the views.

A is a metallic frame of any suitable material which is not readily acted upon by the atmosphere and dampness. On its ends are offsets designed to give the frame a stronger attachment to the cement, wherewith it is attached to the pedestal; and on its inner surface are two grooves adapted to receive the two transparent faces hereinafter described. Between these grooves are attached eyelets, adapted to receive the two stay rods, hereinafter described.

B and B' are two transparent faces, preferably of glass, so shaped as to engage with the metal frame, in the grooves heretofore described.

C and D are two stay rods attached respectively at F and E, and passing from thence respectively through opposite eyelets, and thence through the eyelets J and K to the nut G, the said stay-bolts to be provided respectively with right and left hand threads, adapted to engage with the nut G. The said stay rods may however be arranged in a different manner, with different forms of tombstones, so as to secure the greatest firmness for each kind. The said stay bolts, nut, and eyelets, are situated in the space between the two faces.

H and H' are two attaching stay rods, partially embedded in the opaque body, hereinafter described, their uncovered ends being adapted to be embedded in the cement used in attaching the tombstone to its pedestal. Upon the inner surface of the transparent front face is placed the letters and designs of the inscription which is to accompany each particular tombstone.

The opaque material which is to fill all of the space between the transparent faces and the metal frame is inserted in a condition sufficiently fluid to be poured into the said cavity. I prefer to make the opaque material of plaster of paris.

I construct my device as follows: By means of the nut G, the stay rods are loosened as far as possible and the free ends of the frame are sprung open as far as possible, to enable the glass faces to pass the projections of its extremities. After the faces are inserted in their proper grooves, the frame is brought into close connection with the faces by the action of the nut G and the said stay rods. The tombstone is then inverted and liquid plaster of paris is poured into the space between the faces and the frame, and while the material is still soft, the stay bolts H and H' are partially embedded therein. As soon as the plaster filling has hardened the tombstone is ready for attachment to its pedestal.

Having thus described my invention, what I claim as my own, and desire to secure by Letters Patent of the United States, is—

In a tomb-stone the combination of a metallic frame A, provided with a double groove on its inner surface and adapted to receive in said grooves two faces B and B' of any suitable transparent material, the said frame being held in close connection with these faces, by two stay rods C and D attached to the metallic frame passing back and forth within the space between said faces and being tightened or loosened by the nut G provided with right and left hand threads engaging with the threaded ends of said stay rods; the inscription of the said tombstone being placed upon the inner surface of the face B and all of the space between said faces and frame being filled with a white opaque material; and the two stay bolts H and H' partially embedded in said opaque material, the stay rods C and D being respectively attached to and passing through the eyelets F and E and likewise through the eyelets J and K attached to the frame.

JOHN T. LITTELL.

Witnesses:
 ALBERT ALDINGER,
 ELBA RANSOM.